Figure 1:
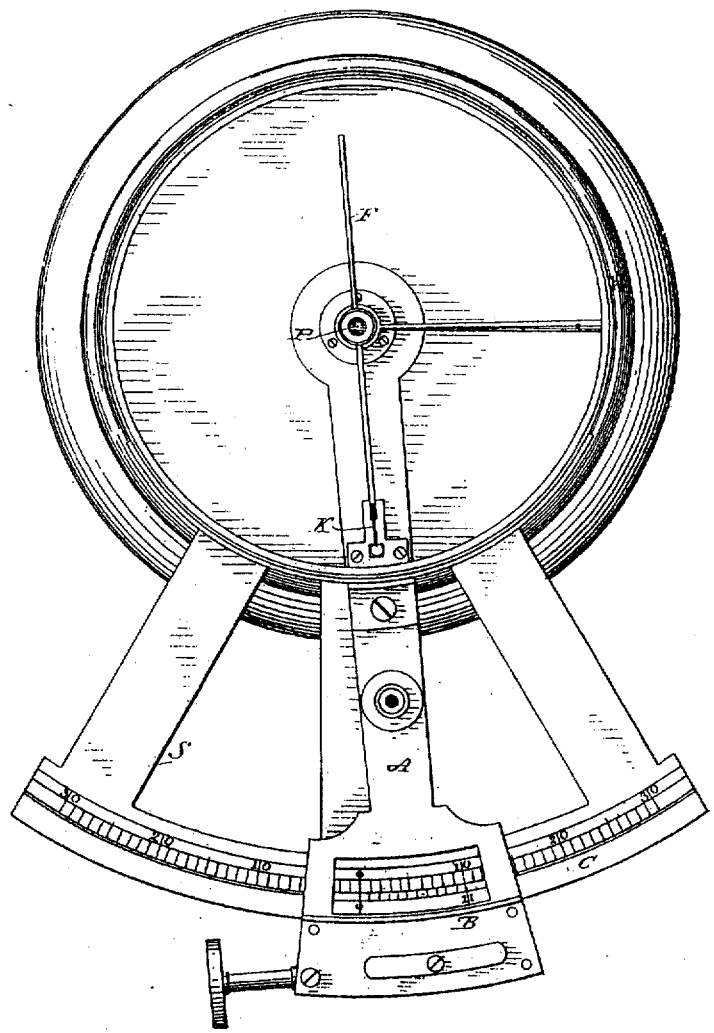

(No Model.)　　　　　　　　　H. GLOVER.　　　　　　2 Sheets—Sheet 1.
ISOMETER OR DYNAMIC SECTOR.

No. 303,928.　　　　　　　　　　　　Patented Aug. 19, 1884.

Witnesses:　　　　　　　　　　　　　　　　　　　Inventor:
Ernest Abshagen　　　　　　　　　　　　　　　　Henry Glover.
Thos. Toomey　　　　By his Attorney: H. L. Townsend (No Model.) 2 Sheets—Sheet 2.

H. GLOVER.
ISOMETER OR DYNAMIC SECTOR.

No. 303,928. Patented Aug. 19, 1884.

Witnesses:
Ernest Abshagen
Thos. Toomey

Inventor:
Henry Glover,
By his Attorney: H. C. Townsend

UNITED STATES PATENT OFFICE.

HENRY GLOVER, OF BROOKLYN, NEW YORK, ASSIGNOR OF ONE-FOURTH TO FOLLEN BEBEE, OF SAME PLACE.

ISOMETER OR DYNAMIC SECTOR.

SPECIFICATION forming part of Letters Patent No. 303,928, dated August 19, 1884.

Application filed July 10, 1883. (No model.)

*To all whom it may concern:*

Be it known that I, HENRY GLOVER, a citizen of the United States, and a resident of Brooklyn, in the county of Kings and State of New York, have invented certain new and useful Improvements in Isometers or Dynamic Sectors, of which the following is a specification.

My invention, which I term an "isometer or dynamic sector," relates to an improvement in that class of philosophical instruments which are termed "boussoles," and is applicable to all such apparatuses, in their various forms, where a pivoted magnet-needle is employed to graphically indicate the magnetic meridian, which passes through the center of the point of observation, and which serves as the basis for further manipulations—such as locating the true meridian, as well as its respective magnetic meridian, to properly define the latitude of any given point, to observe the exact amount of local disturbances which affect the magnetic needle, as on board of an iron ship, and for other purposes, hereinafter more fully described.

As is well known, the magnetic meridian differs from the true meridian by assuming daily a different position, increasing or decreasing either to the east or west of the true meridian, and producing constantly-different bearings at the various points of observations, which necessitates a careful and protracted correction by calculating such difference and bringing the result to bear on the different observations. It is, furthermore, well understood that local attractions of various known and hidden causes will seriously interfere with arriving at any true and efficient result, and the many precautions taken to secure to the mariner's compass, especially an iron ship's, a uniform action to become unaffected by any local disturbances, and solely subject to the deflection of the magnetic meridian, have not proven sufficient to secure at all times, and at all points, and at each change of the ship's course, a mathematically-correct base of errors.

Among other purposes, my invention is designed to remove this objectionable feature of calculating for and with the errors, and is so arranged and proportioned that by simply noting the deflection of the needle on a vernier scale, after the instrument has been adjusted, the exact amount of errors caused by local disturbances, change of the ship's course, or by other causes, will be obtained in points or degrees and minutes.

Figure 2:
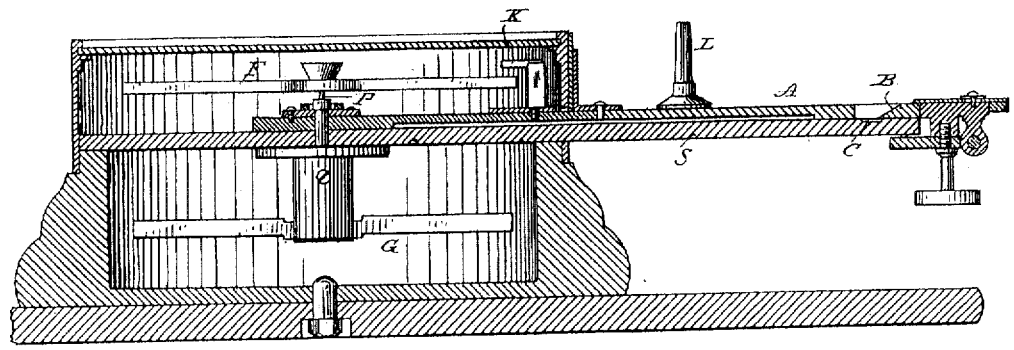
Figure 3:
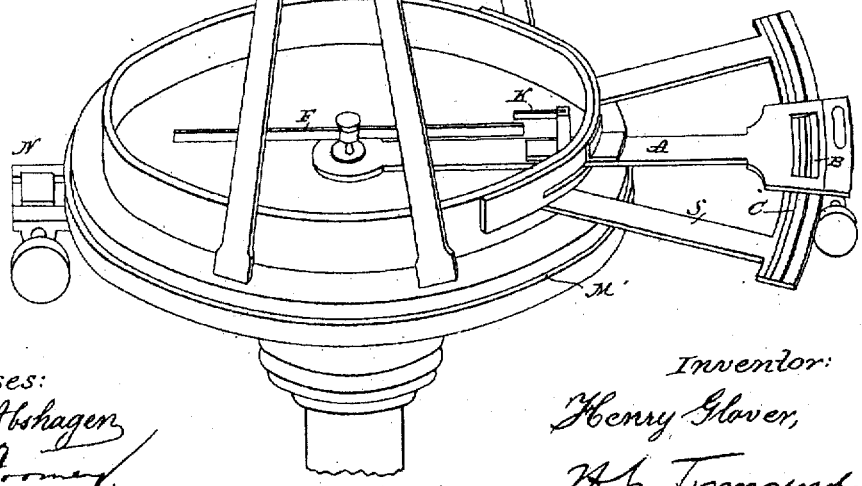

In the accompanying drawings, Figure 1 illustrates in plan view the application of my invention to an ordinary boussole. Fig. 2 illustrates the same in a longitudinal vertical section, and Fig. 3 shows an ordinary transit or theodolite provided with my apparatus.

In Fig. 1, A is the index-lever, fulcrumed radially to the pivot P of the free needle F, and carrying on its outwardly-extending extremity the vernier-plate B.

Rigidly attached to the instrument, and extending radially outwardly, is the sector S with vernier-scale C. The latter is divided into degrees and tenths of a degree to either side of the zero-point, each of said degrees being equal to one thirty-second of the circle upon which the vernier-scale is formed. Each whole division upon the vernier-plate B is subdivided into eleven equal parts bearing a proportion of eleven to ten of the subdivisions of the vernier-scale.

In Fig. 2, G illustrates a fixed needle or magnetic bar solidly attached to the under side of the main plate, and in such position that when said fixed needle is in exact line with the free needle F and the arm A is adjusted to bring pointer K in line with the needle F, the zero of the scales C and B will coincide, as shown in the drawings. K is located in the center line upon the index-lever A, and slightly projecting above and beyond the north end of the free needle F whenever the latter is brought to point in this direction. The index K is in such position upon the lever A that it coincides with the fixed needle when the lever A is in position to bring the zero of the scale and the vernier in coincidence. In the present case the index K is upon the same radial line with the fixed needle, so that, as is obvious, the latter is displaced with relation to the zero on scale S by an amount equal to the difference in circumferential position between the index and the zero of the scale when the vernier reading is zero.

To the standard L may be attached a magnifying-glass to facilitate the reading on the scales. The fixed needle G will exert its influence upon the free needle and cause the latter to assume a nearly like direction whenever the instrument has been partly revolved in azimuth. The earth's magnetic meridian passing through the center of this instrument will also exert its influence upon the free needle F and cause the same to deflect to the right or left of the index K to such an extent as the point of observation and its position and bearing to the true meredian warrant. In case now the index-lever A is revolved to such an extent that its index K will coincide with the north end of the free needle F, then the position of the vernier-plate B on the scale C will indicate in points the difference between the true and magnetic meridian—that is, assuming that the fixed needle represents the true meridian—then the difference between the magnetic and true meridian is shown by the arc of deflection between both—viz., the free statical resisting-needle being submitted to two opposing forces will assume, according to the well-known law of forces, a diagonal direction to the resistance offered. When the instrument is revolved on its own axis until the index or zero-bar is due east and west, the deflection of the free needle from the zero-point will have diverged to its uttermost limits, and whether this angle of deflection be attributed to magnetic currents or other undefined causes, it increases and decreases with the earth's tangential force, and uniformly with the latitude of the place of observation; but when the instrument is on the true meridian of the plane of observation, then there is a perfect coincidence of the free needle and the index-point, and a parallelism of the free and fixed needle, and any divergence whatever of the instrument from the true meridian, either by rotating the instrument in azimuth or by local disturbances, will cause a corresponding deflection of the needle, consequently, at any time or place independent of solar observation or local magnetic disturbances, a true meridian-point can be determined by simply revolving the instrument in azimuth until the free needle coincides with the zero or index point.

Any local disturbance which might operate in part to deflect the free needle can be easily ascertained by placing the instrument in azimuth east and west, and then rotating the index-lever as many points as the plan of observation warrants. Should the north end of the free needle not coincide with the index K on the index-lever, then the amount of points which it is necessary to further rotate the latter will indicate the erroneous deflection caused by local disturbances. Such points reduced to degrees, minutes, and seconds will serve as a base of errors in the various manipulations for which this apparatus is employed. As per illustration: The instrument being situated at a point in New York city, and placed in azimuth to a point coinciding with its lateral bearing—viz., forty degrees and forty minutes, the deflection of the needle at this point being equal to 3.6 points, and the index being set to this scale, a deflection of the free needle is still observed, which, measured on the scale after the index is brought to a coincidence with the end of the needle and now indicating 6.8, shows 3.2 points, caused by local disturbances at this point.

In Fig. 3 of drawings a practical application to a surveying-transit is illustrated, in which M represents the graduated scale of the instrument, serving as simple azimuth in the operation of my apparatus, and N any well-known device for adjusting the same. F is the free needle; K, the index-point; A, the index-lever; C, the vernier-scale, and B its plate.

As all surveys for measuring distances to determine local and geographical boundaries, &c., depend upon the accuracy of finding a true meridian, and as experience has shown that in many geographical localities the local disturbances of the magnetic needle are so variable that it is, with existing means, very difficult to obtain perfectly satisfactory results, free from instrumental errors; hence my invention, as applied to this class of apparatuses in correcting its own error, and independent of celestial observation, will give perfectly true results.

In applying my invention to nautical instruments its prime object will be, aside of determining the variation of the true from the magnetic meridian, to correct the error caused by local disturbances, so difficult to combat in iron ships. Although this error can be detected by celestial observations and other similar ingenious devices, still certain atmospheric conditions—such as foggy weather, equipment, or cargo—will at times prevent the usage of the same by causing the magnetic needle to diverge from its normal direction to such an extent as to render the same entirely useless for the purpose of navigation. Especially would this be the case when the navigator should leave port and almost complete his voyage with constant thick and cloudy weather, and the ship's compass, as his sole guide, being influenced by the magnetic condition of the ship's cargo. From the fact that the error varies in amount by each change of the ship's course, and every change from a vertical position by the ship lying over, the error will increase or decrease with the larboard or starboard angle of the ship, which makes a true solution of this problem of error very difficult.

It is apparent that an instrument that will indicate the error at any time, so that the true course can be estimated for any distance, will be especially advantageous for this purpose.

The construction of the scale on the sector, with its appending vernier, is as follows: The division of 0 to 32 corresponds with the thirty-two points of the azimuth-scale in such a manner that the vernier 0 to 11 represents the thirty-second part of the circle. This part is divided into eleven parts for the vernier, and into ten equal parts for the scale. Thus one point of arc on the sector equals the thirty-second part of the circle, which gives the value of eleven degrees fifteen minutes to each point—that is, the force that drives the free needle, while controlled by the fixed or secondary needle, a distance of one point, as observed on the sector of my isometer, will drive a free needle of an ordinary compass eleven degrees fifteen minutes. Each unit or whole point on the sector being equivalent to eleven degrees fifteen minutes, by subdividing each point into tenths we obtain for each subdivision a value equivalent to one degree seven minutes and five seconds of the ordinary azimuth-scale. The relative length of the free-swinging needle to the fixed needle is proportioned as eighteen is to sixteen, which corresponds to the difference between the equatorial and magnetic planes.

What I claim as my invention is—

1. The combination, with the fixed needle and a scale, each of whose units is one thirty-second of the circle upon which it is formed, and is subdivided into tenths, of a free-swinging needle mounted on a support that is provided with a vernier subdivided into elevenths of the unit for the vernier-scale.

2. The combination, substantially as described, of the fixed needle and scale, with whose center or zero-point said needle corresponds, the free-swinging needle, and an index-lever adapted to be swung so that its index will coincide with the free-swinging needle, and provided with a vernier-plate or other device for use with the fixed scale, as and for the purpose described.

3. The combination of the fixed needle placed beneath and made slightly shorter than the free needle, the sector and scale projecting from the case, the index-arm carrying index K, and the vernier-plate B, as and for the purpose described.

4. The combination, with the fixed and the free-swinging needle, of a curved scale-plate, each division of which is equal to one thirty-second of the circle upon which it is formed, and is subdivided into tenths, and a vernier, eleven of whose subdivisions are equal to ten subdivisions of the scale-plate.

5. The combination, substantially as described, of a free-swinging needle and a fixed needle, relatively proportioned as eighteen to sixteen, and both acting concentrically with the index-bar and scale.

Signed at New York, in the county of New York and State of New York, this 5th day of July, A. D. 1883.

HENRY GLOVER.

Witnesses:
THOS. TOOMEY,
M. M. FRIEND.